(12) United States Patent
Garner et al.

(10) Patent No.: US 6,182,561 B1
(45) Date of Patent: Feb. 6, 2001

(54) VAT BOTTOM CONFIGURATION FOR DEEP FRYER

(75) Inventors: Jack E. Garner, Stockdale; Albert C. McNamara, San Antonio; Rosendo A. Sanchez, San Antonio; Allen F. Clark, San Antonio, all of TX (US)

(73) Assignee: Ultrafryer Systems, Inc., San Antonio, TX (US)

( * ) Notice: Under 35 U.S.C. 154(b), the term of this patent shall be extended for 0 days.

(21) Appl. No.: 09/425,345

(22) Filed: Oct. 22, 1999

(51) Int. Cl.[7] .......................................... A47J 37/12
(52) U.S. Cl. .................... 99/408; 99/407; 99/403
(58) Field of Search .............. 99/408, 403, 407, 99/410, 413, 416, 418

(56) References Cited

U.S. PATENT DOCUMENTS

| | | | |
|---|---|---|---|
| 2,652,767 | * | 9/1953 | Childs ..................................... 99/408 |
| 3,977,973 | * | 8/1976 | Anderson ............................ 99/408 X |
| 4,091,801 | * | 5/1978 | Lazaridis et al. .................. 99/408 X |
| 4,623,544 | * | 11/1986 | Highnote ............................ 99/408 X |
| 5,582,093 | | 12/1996 | Amitrano et al. ...................... 99/408 |
| 5,776,530 | | 7/1998 | Davis et al. .......................... 426/233 |

OTHER PUBLICATIONS

"Installation, Operations and Maintenance Instructions, " Ultrafryer Systems, instructions for Ultrafryer Gas Fryer Model PAR–II–14, 35 pages, Jan. 1998.

"Special Report," *Foodservice Equipment Reports*, 3(9):43–54 (1999).

* cited by examiner

*Primary Examiner*—Reginald L. Alexander
(74) *Attorney, Agent, or Firm*—Banner & Witcoff, Ltd.

(57) ABSTRACT

A fryer system has a vat having a front wall, back wall, two side walls, and a bottom. The bottom is sloped downwardly from the back wall toward the front wall. A trough extends along the front wall and a drain is located in the trough. In certain preferred embodiments, a spray nozzle is oriented to direct a flow of fluid across the bottom of the vat from the back wall toward the trough.

17 Claims, 3 Drawing Sheets

VAT BOTTOM CONFIGURATION FOR DEEP FRYER

INTRODUCTION

The present invention relates to a vat for a deep fryer, and more particularly, to an improved vat bottom configuration for a deep fryer.

BACKGROUND

Deep fryers are commercially used by restaurants, institutional kitchens, and fast food establishments for cooking a variety of food products, such as french fries, fish, fried chicken, and the like. The food product is cooked by totally immersing it within a vat or tank that is filled with heated oil or shortening. The shortening may be heated using a flow of heated gas that is drawn through heat exchanger tubes located within the cooking vat. Food particles tend to accumulate at the bottom of the vat during use. After the vat is drained, a spray nozzle is used to project a sheet of shortening in order to rinse food particles from the bottom of the vat.

The vat bottom typically is formed with a crease or fold extending from the back to the front of the vat, providing a funneling effect and allowing the shortening to collect and flow to a drain centrally located in the bottom of the vat. This configuration of the vat bottom diverts the sheet of sprayed shortening, preventing shortening from reaching and cleaning all areas, e.g., the corners, of the vat bottom.

It is an object of the present invention to provide a vat bottom configuration for a deep fryer which reduces or wholly overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a vat bottom configuration for a deep fryer which has improved cleaning capabilities.

In accordance with a first aspect, a vat for a fryer system has a front wall, a rear wall, first and second side walls, and a bottom. The bottom is substantially planar and slopes downwardly from the rear wall toward the front wall. A trough extends from the first side wall to the second side wall, adjacent the front wall. A drain is located in the trough.

In accordance with another aspect, a vat for a fryer system has a front wall, a rear wall, first and second side walls, and a bottom. The bottom is substantially planar and slopes downwardly from the rear wall toward the front wall. A trough extends from the first side wall to the second side wall, adjacent the front wall. The trough slopes downwardly from the first and second side walls toward a drain located in the trough. A shutoff valve is located in the drain. A spray nozzle is operably connected to a fluid supply, the spray nozzle being oriented to direct fluid across the vat bottom into the trough.

In accordance with yet another aspect, a fryer system has a plurality of vats, each vat having a front wall, a rear wall, first and second side walls, and a bottom. The bottom of each vat is substantially planar and slopes downwardly from the rear wall toward the front wall. A trough extends from the first side wall to the second side wall along a bottom of the front wall of each vat. A drain is located in the trough of each vat. A spray nozzle in each vat is operably connected to a fluid supply, the spray nozzle being oriented to direct fluid across the vat bottom into the trough. Each drain is operably connected to a drain pan.

From the foregoing disclosure, it will be readily apparent to those skilled in the art, that is, those who are knowledgeable or experienced in this area of technology, that the present invention provides a significant technological advance. Preferred embodiments of the invention can provide improved cleaning capabilities for the vat of a deep fryer. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

Figure 1:
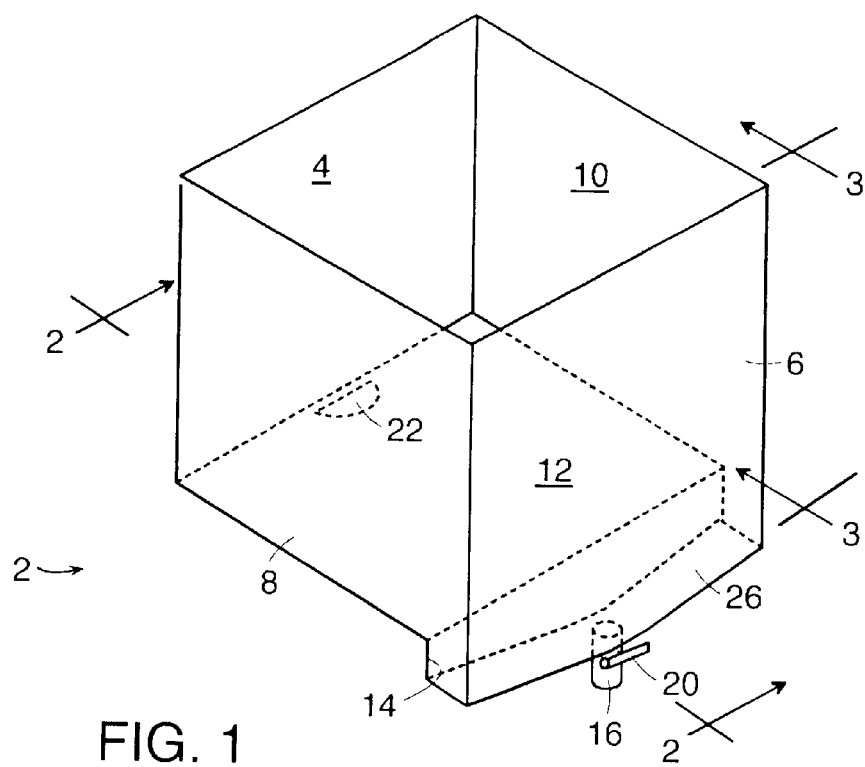
FIG. 1 is a schematic perspective view of a vat of a deep fryer in accordance with the present invention.

The figures referred to above are not drawn necessarily to scale and should be understood to present a representation of the invention, illustrative of the principles involved. Some features of the vat bottom configuration depicted in the drawings have been enlarged or distorted relative to others to facilitate explanation and understanding. Vat bottoms for deep fryers, as disclosed herein, will have configurations and components determined, in part, by the intended application and environment in which they are used.

DETAILED DESCRIPTION OF CERTAIN PREFERRED EMBODIMENTS

Referring to FIG. 1, a vat of a deep fryer according to the present invention is shown generally by reference numeral 2. A plurality of heat exchanger tubes extend across vat 2, but are not shown in the drawings in order to more clearly illustrate the configuration of vat 2. Vat 2 has a back wall 4, front wall 6, left side wall 8, right side wall 10, and a bottom 12. A trough 14 is formed in bottom 12, extending between left and right side walls 8, 10 along the bottom of front wall 6. A drain 16 is located in trough 14, with a shutoff valve 20 positioned in drain 16. Spray nozzle 22 is located on bottom 12, proximate back wall 4. In other preferred embodiments, spray nozzle 22 could be located at other suitable positions, e.g., on back wall 4 proximate bottom 12.

Figure 2:
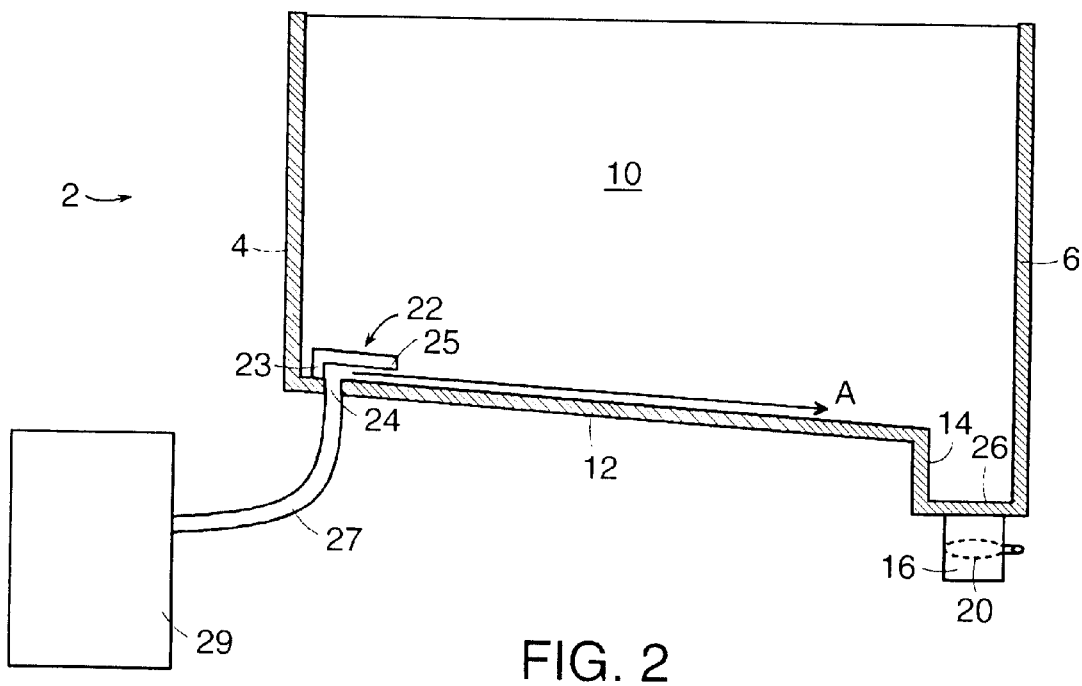
FIG. 2 is a schematic section view of the vat of FIG. 1, taken along section lines 2—2 of FIG. 1.
Figure 4:
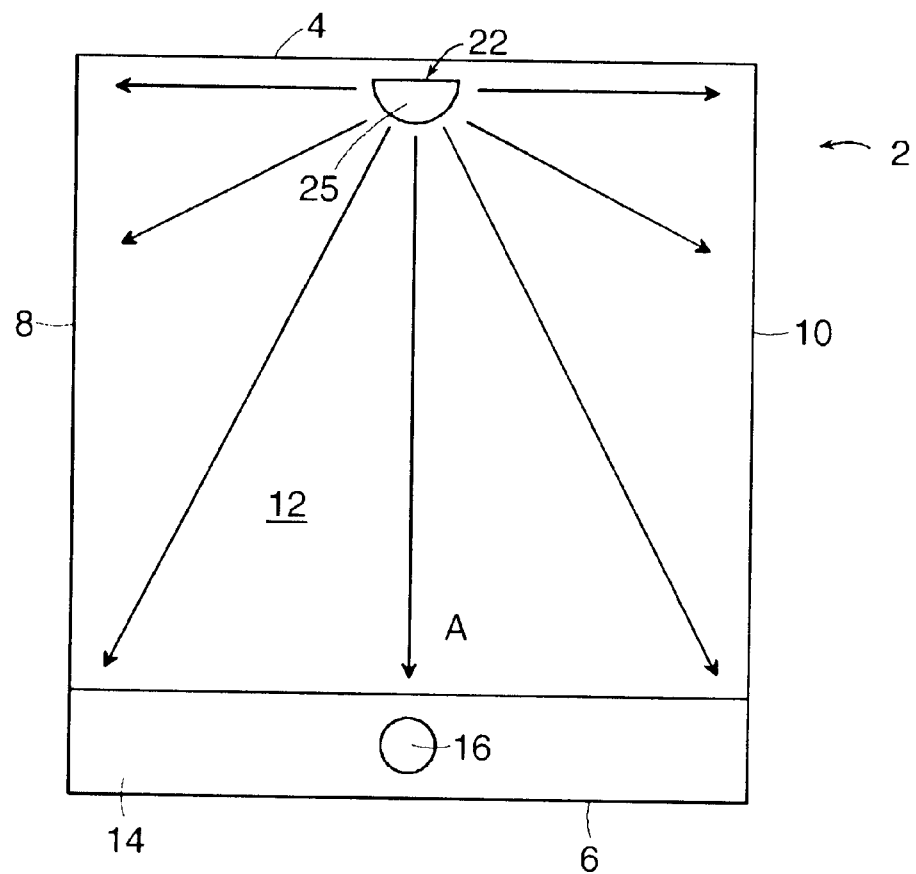
FIG. 4 is a schematic plan view, showing the spray pattern from a spray nozzle of the vat of FIG. 1.

As seen in FIG. 2, bottom 12 is substantially planar and is sloped downwardly from back wall 4 toward trough 14 and front wall 6. In a preferred embodiment, the internal dimensions of vat 2 are approximately 20" by 20", and bottom 12 slopes downwardly at an angle of approximately 1.58°. In another preferred embodiment, the internal dimensions of vat 2 are approximately 18" by 18", and bottom 12 slopes downwardly at an angle of approximately 1.84°. In yet another preferred embodiment, the internal dimensions of vat 2 are approximately 14" by 14", and bottom 12 slopes downwardly at an angle of approximately 3.42°. In certain preferred embodiments, spray nozzle 22 comprises an upstanding wall member 23 extending along bottom 12 substantially parallel to back wall 4, and a plate 25 connected thereto. Plate 25 is hemispherically shaped and lies in a plane substantially parallel to the plane of bottom 12, as seen in FIG. 4. Inlet port 24 is located below plate 25 and receives a supply of shortening through a conduit or tube 27 from a reservoir 29 of shortening. As the shortening enters vat 2 through inlet port 24, it is deflected by plate 25 and wall member 23 across bottom 12 in a sheet, as shown by arrow A. Other suitable configurations for spray nozzles will become readily apparent to those skilled in the art, given the benefit of this disclosure. In certain preferred embodiments, shortening is supplied from reservoir 29 at variable pressure via a pump (not shown).

Figure 3:
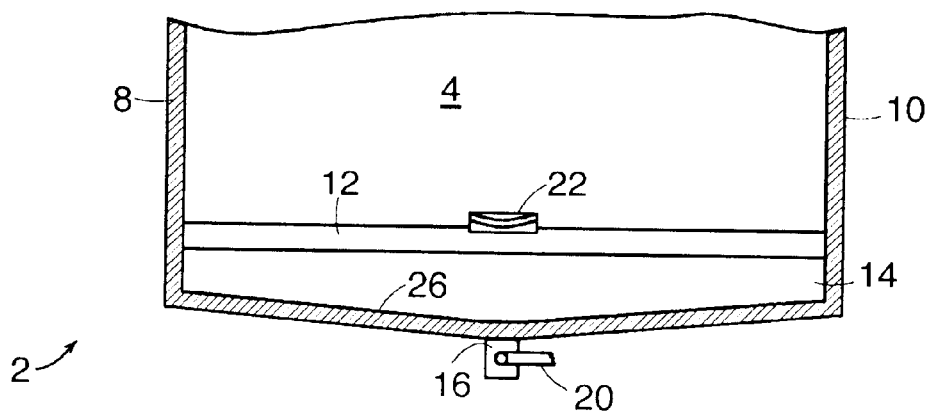
FIG. 3 is a schematic section view of the vat of FIG. 1, shown partially cut away and taken along section lines 3—3 of FIG. 1.

In the embodiment illustrated in FIG. 3, drain 16 is centrally located in trough 14, with a bottom 26 of trough 14 sloping downwardly from its outer edges, at first and second side walls 8, 10, respectively, toward drain 16. In a preferred embodiment, the internal dimensions of vat 2 are approximately 20" by 20", and bottom 26 slopes downwardly at an angle of approximately 6.8°. In another preferred embodiment, the internal dimensions of vat 2 are approximately 18" by 18", and bottom 26 slopes downwardly at an angle of approximately 7.7°. In yet another preferred embodiment, the internal dimensions of vat 2 are approximately 14" by 14", and bottom 26 slopes downwardly at an angle of approximately 10°.

In other preferred embodiments, drain 16 could be located in other locations in trough 14, e.g., proximate first or second side walls 8, 10. Trough 14 in such embodiments would, accordingly, be sloped downwardly from side walls 8, 10 toward drain 16.

A description of the operation of vat 2 of a deep fryer will now be provided. During cooking of food product, shutoff valve 20 is closed and vat 2 is filled with shortening. The shortening is then heated by warm gas in the heat exchanger tubes. Food product, e.g., fried chicken, is placed in vat 2 for cooking by the heated shortening. After cooking is completed, vat 2 can be cleaned. In order to clean vat 2, shutoff valve 20 is opened and the shortening in vat 2 is drained. As seen in FIG. 4, shortening is projected from spray nozzle 22 in a fan-shaped spray pattern across bottom 12, shown with arrows A. Since bottom 12 is substantially planar and sloped downwardly from back wall 4 toward trough 14, shortening projected from nozzle 22 is free to spray across substantially the entire surface of bottom 12, thereby rinsing away any food particles or other material which may have accumulated on bottom 12. Accordingly, the sloped, planar configuration of bottom 12 provides improved cleaning of substantially the entire surface of bottom 12. The sprayed shortening flows along sloped bottom 12 toward front wall 6 until it reaches and falls into trough 14. From trough 14 the shortening flows into drain 16 and out of vat 2.

Figure 5:
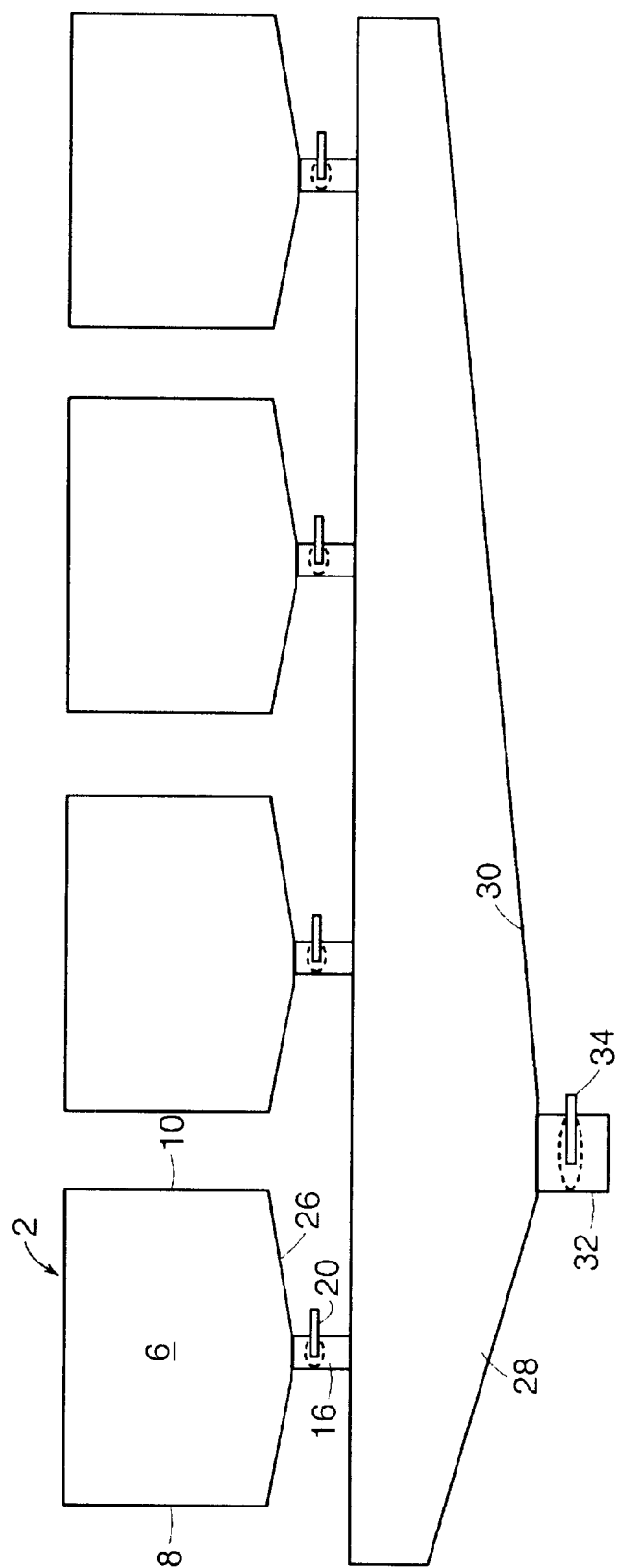
FIG. 5 is a schematic elevation view of a plurality of vats of the present invention shown connected to a drain pan.

In another preferred embodiment, seen in FIG. 5, a plurality of vats 2 are connected to a drain pan 28. Shortening in vats 2 is discharged through drains 16 into drain pan 28. A bottom 30 of drain pan 28 is sloped downwardly toward a drain 32 which connects to a filter tub (not shown) for filtering of the shortening. Drain 32 may be located at any suitable position along drain pan 28. In certain preferred embodiments, a shutoff valve 34 is located in drain 32. Four vats 2 are shown in FIG. 5 discharging shortening into drain pan 28, however, the actual number of vats connected to drain 32 may be larger or smaller based on a particular user's requirements.

In light of the foregoing disclosure of the invention and description of the preferred embodiments, those skilled in this area of technology will readily understand that various modifications and adaptations can be made without departing from the true scope and spirit of the invention. All such modifications and adaptations are intended to be covered by the following claims.

What is claimed is:

1. A vat for a fryer system comprising, in combination:
   a front wall;
   a rear wall;
   first and second side walls;
   a bottom, the bottom being substantially planar and sloping downwardly from the rear wall toward the front wall;
   a trough extending from the first side wall to the second side wall adjacent the front wall;
   a drain located in the trough, and
   a spray nozzle operably connected to a fluid supply, wherein the spray nozzle is oriented to direct fluid from the fluid supply across substantially the entire surface of the bottom of the vat into the trough.

2. The vat according to claim 1, wherein a bottom of the trough slopes downwardly toward the drain.

3. The vat according to claim 1, wherein the drain is located in a central portion of the trough.

4. The vat according to claim 3, wherein a bottom of the trough slopes downwardly from the side walls toward the drain.

5. The vat according to claim 1, wherein the spray nozzle is oriented to project a substantially planar sheet of fluid across the bottom of the vat.

6. The vat according to claim 1, wherein the spray nozzle is oriented to project a substantially planar sheet of fluid across the bottom of the vat in a substantially fan-shaped pattern.

7. The vat according to claim 1, wherein the spray nozzle is located on the bottom of the vat proximate the back wall.

8. The vat according to claim 7, wherein the spray nozzle is located proximate the center of the back wall.

9. The vat according to claim 1, further comprising a shutoff valve located in the drain.

10. A vat for a fryer system comprising, in combination:
    a front wall;
    a rear wall;
    first and second side walls;
    a bottom, the bottom being substantially planar and sloping downwardly from the rear wall toward the front wall;
    a trough extending from the first side wall to the second side wall, adjacent the front wall, the trough sloping downwardly from the first and second side walls toward a drain located in the trough;
    a shutoff valve located in the drain; and
    a spray nozzle operably connected to a fluid supply, wherein the spray nozzle is oriented to direct fluid from the fluid supply across substantially the entire surface of the bottom of the vat into the trough.

11. The vat according to claim 10, wherein the spray nozzle is oriented to project a substantially planar sheet of fluid across the bottom of the vat.

12. The vat according to claim 10, wherein the spray nozzle is oriented to project a substantially planar sheet of fluid across the bottom of the vat in a substantially fan-shaped pattern.

13. The vat according to claim 10, wherein the spray nozzle is located on the bottom of the vat proximate the back wall.

14. A vat for a fryer system comprising, in combination:

a plurality of vats, each vat having a front wall, a rear wall, first and second side walls, and a bottom, the bottom being substantially planar and sloping downwardly from the rear wall toward the front wall;

a trough in each vat extending from the first side wall to the second side wall, adjacent the front wall;

a drain located in the trough of each vat;

a spray nozzle in each vat operably connected to a fluid supply, the spray nozzle being oriented to direct fluid from the fluid supply across the bottom of the vat into the trough; and a drain pan, each drain operably connected to the drain pan.

15. The fryer system according to claim 14, further comprising a shutoff valve located in each drain.

16. The fryer system according to claim 14, wherein the trough in each vat slopes downwardly toward its respective drain.

17. The fryer system according to claim 14, wherein the drain in each vat is located in a central portion of the trough of that vat.

* * * * *